L. A. CARPENTER & R. MIDDLETON.
FLUSH PIPE HANGER.
APPLICATION FILED MAY 7, 1913.
1,196,930.  Patented Sept. 5, 1916.
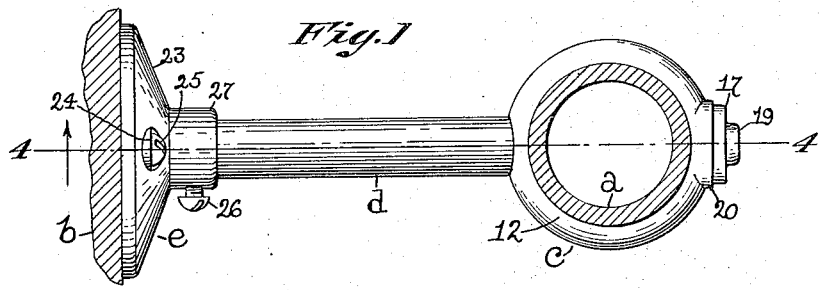
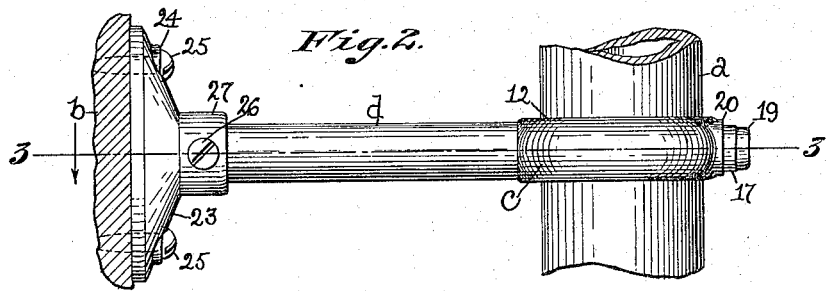
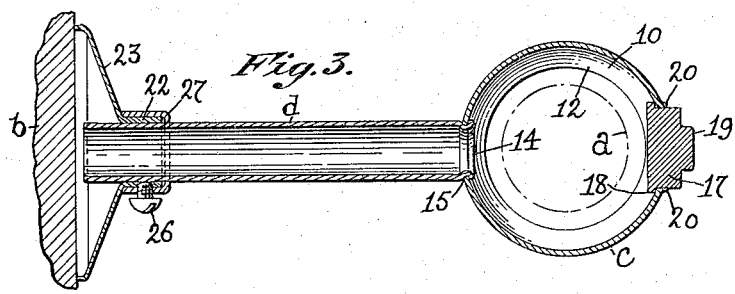
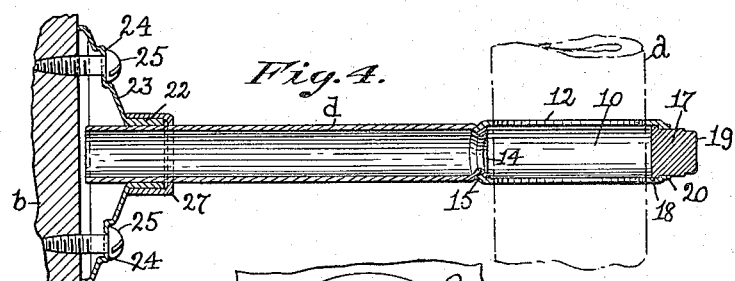
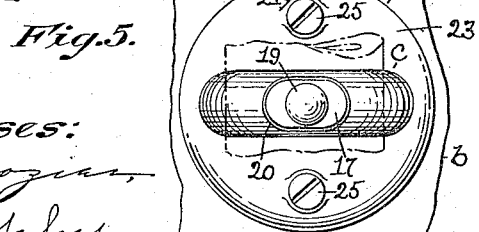

UNITED STATES PATENT OFFICE.

LEWIS A. CARPENTER AND RICHARD MIDDLETON, OF REVERE, MASSACHUSETTS.

FLUSH-PIPE HANGER.

1,196,930.  Specification of Letters Patent.  Patented Sept. 5, 1916.

Application filed May 7, 1913. Serial No. 766,037.

*To all whom it may concern:*

Be it known that we, LEWIS A. CARPENTER and RICHARD MIDDLETON, citizens of the United States, residing in Revere, county of Suffolk, and State of Massachusetts, have invented an Improvement in Flush-Pipe Hangers, of which the following description, in connection with the accompanying drawings, is a specification, like characters on the drawings representing like parts.

This invention relates to a pipe hanger especially designed and adapted among other uses to be employed on the flush pipes of water closets to hold them away from the wall of the bath or other room.

The invention has for its object to provide a superior article at a reduced cost. To this end, the pipe engaging member of the hanger is made as a sheet metal ring, which is continuous and concaved transversely on its inner surface to form an annular groove or channel, whose side walls engage the pipe. The one piece ring is provided with substantially diametrically opposite openings, one for attachment of the ring to a stem, and the other for the reception of a bumper of rubber or other resilient material. The bumper referred to is retained in its opening as will be described. The stem is secured to a suitable base as will be described. These and other features of this invention will be pointed out in the claims at the end of this specification.

Figure 1 is a plan view of a hanger embodying this invention, the pipe being shown in section. Fig. 2, an elevation of Fig. 1. Fig. 3, a horizontal section on the line 3—3, Fig. 2. Fig. 4, a section on the line 4—4, Fig. 1, and Fig. 5, an end elevation of Fig. 1.

Referring to the drawing, $a$ represents the vertical flush pipe commonly used with the bowl of a water closet, and $b$ the wall of the bath or other room in which said bowl is located. The flush pipe $a$ has coöperating with it a hanger comprising a pipe engaging member $c$, a stem $d$ and a base $e$.

The member $c$ is made as a sheet metal ring, which is continuous and concaved transversely on its inner side to form an annular channel or groove 10, whose side walls 12 are designed to engage the pipe $a$. The ring $c$ is provided with substantially diametrically opposite openings, through the rear one of which is extended a reduced end portion 14 of the stem $d$, which is preferably a metal tube, said end portion 14 being expanded within the ring to firmly lock the ring to the tube against a shoulder 15 thereof. The other opening in the ring has extended through it a bumper 17 of rubber or other resilient material, which projects away from the hanger and is designed to engage the seat of the closet in a manner well understood. The bumper 17 is preferably made substantially oval in shape and is provided on its inner side with a flange 18, which engages the inner surface of the metal ring $c$ and prevents the bumper from being pulled out of the ring from the outside thereof.

The bumper on its outer side may be provided with a central teat or projection 19. The opening through which the bumper projects may and preferably will be provided with outwardly extended walls 20 to support the bumper and to impart a pleasing appearance to the front of the hanger.

It will thus be seen, that after the bumper has been placed in position and the pipe has been passed through the ring, the bumper is locked in its operative position. The stem $d$ of the hanger may be secured to the tubular extension 22 of a base plate 23, preferably of sheet metal, which is substantially conical in form and provided with a plurality of substantially flat surfaces 24 formed by striking up portions of the conical base plate, said flat surfaces having holes through them for the passage of the screws 25, which secure the base plate to the wall and whose flat surfaces afford a bearing for the heads of the screws.

The stem $d$ is adjustably secured to the tubular extension 22 by the set screw 26, and the said stem may have on it a loose collar 27, which fits over the extension and is fastened by the screw 26, the said collar serving to conceal the extension 22 and to impart a finish to the hanger.

By making the pipe engaging member as a continuous sheet metal ring, which is concaved transversely on its inner side to form an annular channel or groove, said member is made of the desired strength and materially lighter and cheaper, and also enables the bumper to be locked within the groove without interfering with the pipe.

Claims:

1. A pipe hanger of the class described, comprising a pipe-engaging member consisting of a continuous ring of sheet metal concaved transversely to form an annular channel or groove whose side walls engage the pipe and provided with substantially diametrically opposite openings in its concaved portion, one of said openings having outwardly extended walls to support a bumper, and a stem having a reduced portion forming a shoulder and extended through the other of said openings and expanded within the annular groove to lock the pipe-engaging ring to said stem.

2. A pipe hanger of the class described, comprising a pipe-engaging member consisting of a continuous ring of sheet metal concaved transversely to form an annular channel or groove whose side walls engage the pipe and provided with substantially diametrically opposite openings, and a stem extended through one of said openings and secured to said ring.

In testimony whereof, we have signed our names to this specification in the presence of two subscribing witnesses.

LEWIS A. CARPENTER.
RICHARD MIDDLETON.

Witnesses:
JAS. H. CHURCHILL,
J. MURPHY.

Copies of this patent may be obtained for five cents each, by addressing the "Commissioner of Patents, Washington, D. C."